(12) United States Patent
Rogers et al.

(10) Patent No.: US 12,099,632 B2
(45) Date of Patent: Sep. 24, 2024

(54) BUILDING DATA-SECURE GROUP PROFILES

(71) Applicant: Microsoft Technology Licensing, LLC, Redmond, WA (US)

(72) Inventors: Ryan M. Rogers, Los Gatos, CA (US); Mingyang Hu, San Francisco, CA (US); Adrian Rivera Cardoso, San Francisco, CA (US); Raymond E. Ortigas, Brooklyn, NY (US); Humberto A. Gonzalez Cabezas, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 17/683,269

(22) Filed: Feb. 28, 2022

(65) Prior Publication Data
US 2023/0274028 A1 Aug. 31, 2023

(51) Int. Cl.
*G06F 21/62* (2013.01)
*H04L 67/306* (2022.01)

(52) U.S. Cl.
CPC ...... *G06F 21/6254* (2013.01); *G06F 21/6263* (2013.01); *H04L 67/306* (2013.01)

(58) Field of Classification Search
None
See application file for complete search history.

(56) References Cited

U.S. PATENT DOCUMENTS

| 11,170,131 | B1 | 11/2021 | Rogers et al. | |
|---|---|---|---|---|
| 2010/0318546 | A1* | 12/2010 | Kenthapadi | G06F 16/9532 707/769 |
| 2011/0208763 | A1* | 8/2011 | McSherry | G06F 16/901 707/757 |
| 2017/0109544 | A1* | 4/2017 | Chen | G06F 21/6254 |
| 2017/0142119 | A1* | 5/2017 | Zhang | H04L 63/102 |
| 2018/0268306 | A1* | 9/2018 | Laine | G06N 5/01 |

(Continued)

OTHER PUBLICATIONS

Balle, et al., "Improving the Gaussian Mechanism for Differential Privacy: Analytical Calibration and Optimal Denoising", In Proceedings of the 35th International Conference on Machine Learning, Jul. 10, 2018, 10 Pages.

(Continued)

*Primary Examiner* — Chris Parry
*Assistant Examiner* — Abderrahmen Chouat
(74) *Attorney, Agent, or Firm* — NICHOLSON DE VOS WEBSTER & ELLIOTT LLP

(57) ABSTRACT

Technologies for digital content distribution include creating a data set that includes a plurality of entity data records each comprising a plurality of attribute values. By applying a first data security technique to the data set, a first query term and a matching subset of the plurality of entity data records are determined. A second data security technique is applied to the matching subset. When output of the second data security technique satisfies a first noisy threshold, the first query term is added to a set of query terms. A third data security technique is applied to the matching subset. When output of the third data security technique satisfies a second noisy threshold, the set of query terms is expanded to include a second query term. The set of query terms is used to perform the digital content distribution.

20 Claims, 6 Drawing Sheets

(56) References Cited

U.S. PATENT DOCUMENTS

| | | | |
|---|---|---|---|
| 2019/0087604 A1* | 3/2019 | Antonatos | G06F 21/6245 |
| 2022/0277097 A1* | 9/2022 | Cabot | H04W 12/02 |
| 2023/0078704 A1* | 3/2023 | Sun | G06F 21/6227 |
| | | | 713/171 |

OTHER PUBLICATIONS

Durfee, et al., "Practical Differentially Private Top-k Selection with Pay-what-you-get Composition", In Repository of arXiv:1905.04273v1, May 10, 2019, 47 Pages.

Dwork, et al., "The Algorithmic Foundations of Differential Privacy", In Journal Foundations and Trends in Theoretical Computer Science, vol. 9, Issue 3-4, Aug. 11, 2014, 281 Pages.

Dwork,, et al., "On the Complexity of Differentially Private Data Release: Efficient Algorithms and Hardness Results", In Proceedings of the 41st Annual ACM Symposium on Theory of Computing, May 31, 2009, pp. 381-390.

Geng, et al., "Truncated Laplacian Mechanism for Approximate Differential Privacy", In Repository of arXiv:1810.00877v1, Oct. 1, 2018, 14 Pages.

Imana, et al., "Auditing for Discrimination in Algorithms Delivering Job Ads", In Proceedings of the International Conference on World Wide Web, Apr. 19, 2021, 13 Pages.

Kairouz, et al., "Extremal mechanisms for local differential privacy", In Proceedings of the Advances in Neural Information Processing Systems, Dec. 8, 2014, 9 Pages.

Lyu, et al., "Understanding the Sparse Vector Technique for Differential Privacy", In Proceedings of the VLDB Endowment, vol. 10, No. 6, Feb. 2017, pp. 637-648.

Murtagh, et al., "The Complexity of Computing the Optimal Composition of Differential Privacy", In Theory of Cryptography Conference, Jan. 10, 2016, pp. 157-175.

Zhu, et al., "Improving Sparse Vector Technique with Renyi Differential Privacy", In Proceedings of the 34th Conference on Neural Information Processing Systems, Dec. 6, 2020, 10 Pages.

\* cited by examiner

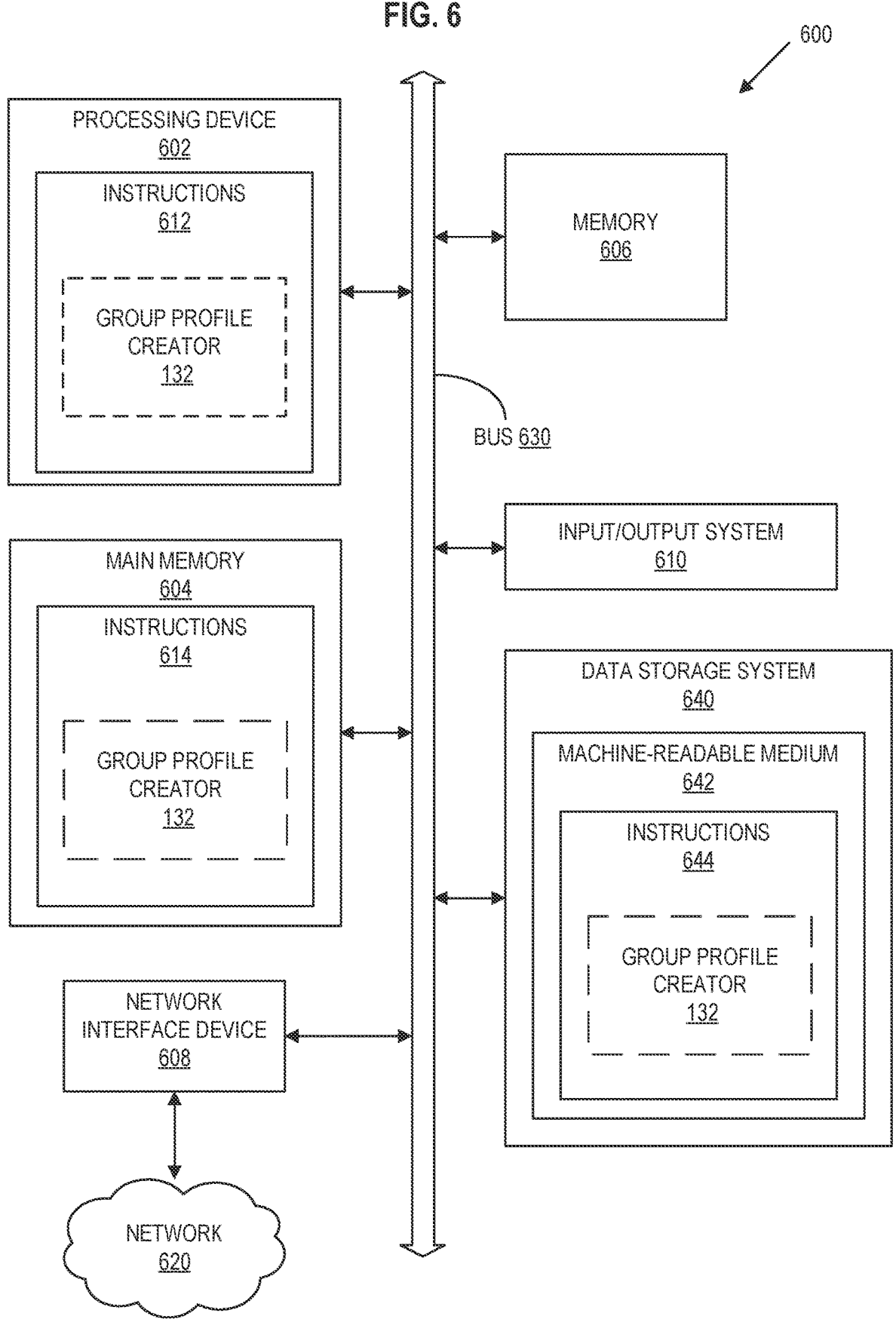

BUILDING DATA-SECURE GROUP PROFILES

TECHNICAL FIELD

A technical field to which the present disclosure relates is the creation of digital profiles for use by content distribution systems. Another technical field to which the present disclosure relates is data security.

BACKGROUND

Software applications use computer networks to distribute digital content to user computing devices. The performance of a content distribution system can be measured based on signals generated at the user device, such as clicks, conversions, and other user interface events. Those signals often vary based on how well digital content distributions match the user's preferences and interests.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 is a block diagram of an example computer system 600 in which embodiments of the present disclosure can operate.

DETAILED DESCRIPTION

Figure 1:
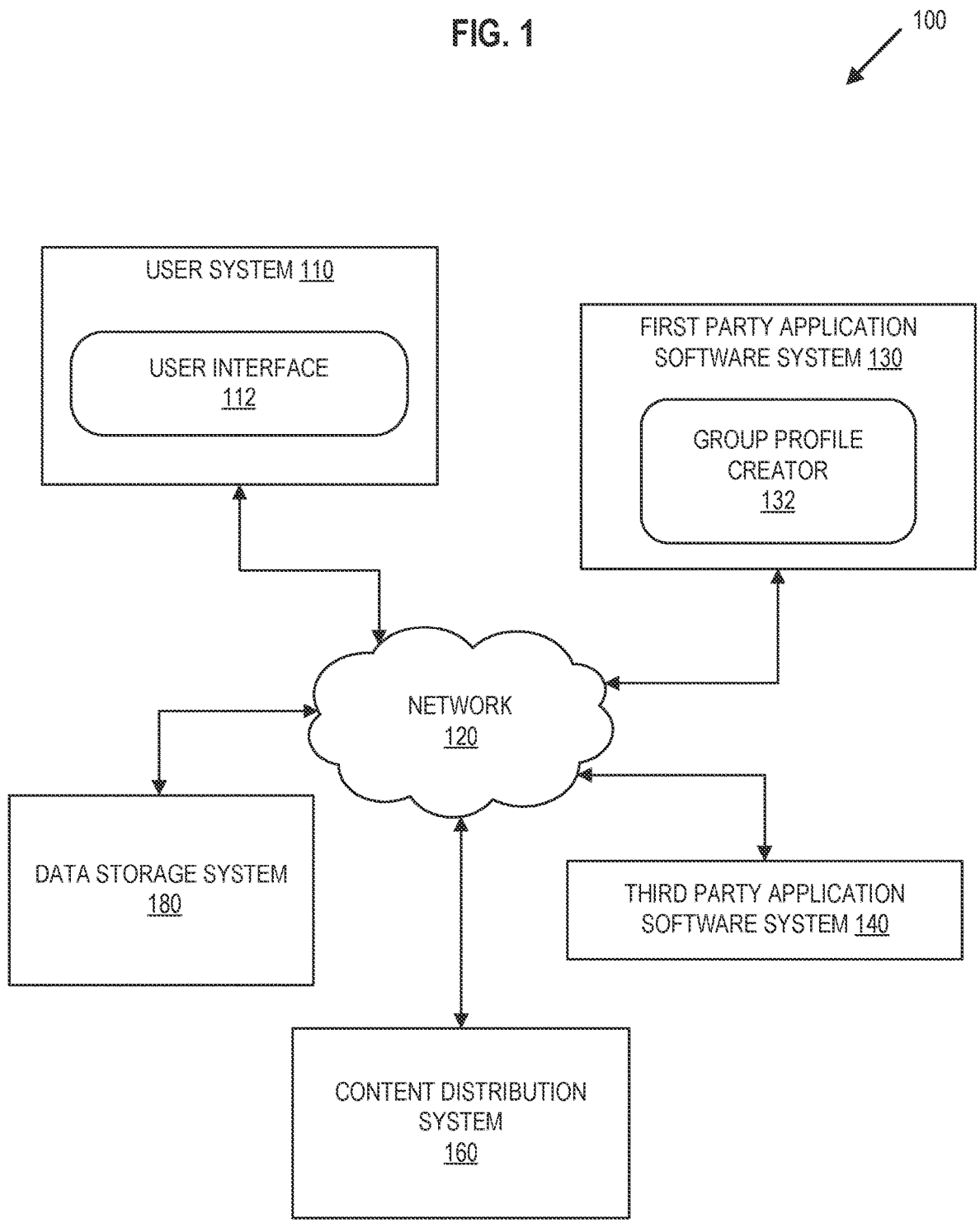
FIG. 1 illustrates an example computing system 100 that includes a group profile creator component in accordance with some embodiments of the present disclosure.

Aspects of the present disclosure are directed to technologies for creating a data-secure group profile for a group of entities that have at least one attribute value in common. Group profile as used herein refers to a set of query terms that operates as a definition of a group of entities without identifying individual entities in the group. For example, a group profile includes a set of query terms that may correspond to attribute values contained in one or more entity data records, where those query terms and attribute values do not uniquely identify any particular entity data record. For instance, a specific value of a user identifier is not considered a query term for creating a group profile for the purposes of this disclosure, but a job title or a geographic location could be a valid query term used to create a group profile according to this disclosure. Examples of query terms include facets, attributes, and segments.

The group profile can be matched to attribute values contained in entity data records. Examples of entity data records include user profile records, company profile records, job profile records, and other types of entity data records. For instance, a group profile of "software developers in the Bay Area" could be used to identify a set of entities that have "software developer" as a job title or job description and "Bay Area" as a geographic location.

The group profile can be used to perform content distribution. For example, the group profile can be used to match the set of matching entities with a content distribution such as a news article about software companies in the Bay Area or a set of job postings by software companies that are currently hiring.

Other approaches have matched content distributions to individual entities rather than to groups of entities. A drawback of those entity-centric approaches is the risk of data leakage. Systems that do not adequately protect sensitive entity information, such as the fact that a user belongs to a particular group, can become the target of hacking attempts resulting in performance losses and reputational issues for a content distribution system.

Techniques for ensuring data security include k-anonymity and differential privacy. Others have viewed these techniques as alternatives, even mutually exclusive. The k-anonymous algorithm can be used to ensure that the size of an in-group of entities that have a common characteristic and the size of the out-group not having that characteristic are both large enough that membership in the in-group cannot be conclusively determined. Differential privacy algorithms incorporate noise (e.g., members of the out-group) into the in-group to ensure that any individual entity has deniability as to whether or not they are a member of the in-group.

To cluster entities so that the clusters can be described by group profiles that have k-anonymity, a system needs to ensure (1) that the entity clusters each contain at least k entities and (2) that the description of the group profile for a given cluster accurately describes the entities contained in that cluster. On the other hand, to ensure differential privacy, the system needs to ensure that, for a given entity cluster, the entity cluster and its corresponding group profile are almost equally likely to occur even if any individual entity were removed from the cluster. In k-anonymity, typically, the value of k is increased to increase the data security/privacy of a k-anonymous cluster, which increases the number of entities in a given cluster as a result. However, to increase privacy with differential privacy, the amount of noise added to a cluster is increased as part of the process of generating the clusters, which, as a result, produces less descriptive group profiles. Thus, increasing differential privacy has the effect of increasing the generalization of the group profile descriptions, which has the effect of increasing cluster sizes (i.e., the number of entities in the cluster) but reducing the number of entities in the cluster that actually match the group profile, due to the increased amount of noise added to the cluster.

Other approaches have selected query terms for inclusion in a group profile based on frequency of use, e.g., popularity of the query term. However, because these approaches tend to select the most popular terms, the resulting group sizes tend to be very large. In content distribution systems, very large group sizes described by only a few query terms can be undesirable due to low precision and low recall.

Thus, a technical challenge is to create group profiles that can be used to generate groups that are not only both k-anonymous and differentially private but also enable content distribution systems to achieve high precision and high recall.

Aspects of the present disclosure address the above and other deficiencies and challenges. For example, embodiments create group profiles using a combination of k-anonymity and differential privacy data security techniques. Embodiments combine these techniques in a non-intuitive way that both enables a group to be of a desired minimum size and prevents individual entities from being conclusively identified as members of the group, while also permitting the group definition to be precise enough and descriptive enough to enable content distribution systems to perform well.

Embodiments apply both k-anonymity and differential privacy to a group of data records, where the group of data records is created using a value-ranked list of query terms. The value used to place the query terms in a rank order correlates with user interface events that are indicators of value, such as conversions, rather than frequency of use of the query term, popularity of the query term, or other criteria that are likely to result in a matching data set that is too large to achieve good precision and recall on a content distribution. The group profiles produced by the disclosed embodiments can be used to generate k-anonymous, differentially private groups of entities and match those groups to content distributions without matching the individual entities to the contributions while achieving high precision and recall in comparison to entity-based matching approaches.

The disclosed technologies are described with reference to a use case of online network-based digital content distribution. An example of a content distribution use case is the targeted distribution of digital advertisements for products and/or services. However, aspects of the disclosed technologies are not limited to ads distribution, but can be used to improve digital content distribution more generally.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes a group profile creator in accordance with some embodiments of the present disclosure.

In the embodiment of FIG. 1, computing system 100 includes a user system 110, a network 120, a first party application software system 130, a third party application software system 140, a content distribution system 160, and a data storage system 180.

In FIG. 1, a group profile creator 132 is embodied in first party application software system 130. Group profile creator 132 is a software-based component that implements the technologies described herein. For example, group profile creator 132 generates group profiles that can be used to create k-anonymous and differentially private data sets that match the group profile description (i.e., the query terms contained in the group profile). As shown in FIG. 6, embodiments of the group profile creator 132 are implemented as instructions stored in a memory, and a processing device 602 can be configured to execute the instructions stored in the memory to perform the operations described herein. Further details with regard to the operations of the group profile creator 132 are described below.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion of first party application software system 130 and/or a front-end portion of third party application software system 140. For example, embodiments of user interface 112 include a graphical display screen that includes one or more slots. A slot as used herein refers to a space on a graphical display such as a web page or mobile device screen, into which digital content may be loaded during a content distribution. The locations and dimensions of a particular slot on a screen are specified using, for example, a markup language such as HTML (Hypertext Markup Language). On a typical display screen, a slot is defined by two-dimensional coordinates; however, in a virtual reality or augmented reality implementation, a slot may be defined using a three-dimensional coordinate system.

User interface 112 is any type of user interface as described above. User interface 112 can be used to input search queries and view or otherwise perceive output that includes data produced by first party application software system 130 or third party application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Any network-based application software system can act as a content distribution system. For example, news and entertainment apps installed on mobile devices, messaging systems, and social graph-based applications can all function as content distribution systems. Content distribution systems use various criteria to match particular digital content items to particular content distributions.

First party application software system 130 is any type of application software system that provides or enables at least one form of digital content distribution to user systems such as user system 110. Examples of first party application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

First party application as used herein may refer to a software application that is considered the owner of particular data or that has been granted permission by a user to use certain data. For example, an application that requires users to agree to a set of terms and conditions regarding data security may be considered a first party application with respect to data created as a result of the users' use of the first party application.

Third party application software system 140 is any type of application software system that provides or enables at least one form of digital content distribution to user systems. Examples of third party application software system 130 include but are not limited to any type of networked software application including mobile apps such as social media platforms, news and entertainment apps, messaging apps, search engines, or any combination of any of the foregoing.

Third party application as used herein may refer to a software application that is different than first party application 130 in terms of its publisher, platform, or other considerations. A third party application may refer to a software application that is considered the owner of particular data or that has been granted permission by a user to use certain data, which is not the first party application 130. For example, an application that requires users to agree to a set of terms and conditions regarding data security may be considered a third party application with respect to data created as a result of the users' use of the third party application. Certain data owned or used by a third party application 140 is not owned by the first party application 130 and the first party application 130 may not have been granted permission to use that data. Likewise, certain data owned or used by a first party application 130 is not owned by the third party application 140 and the third party application 140 may not have been granted permission to use that data.

Content distribution system 160 is a technology platform that facilitates access to digital content items across multiple different application, systems, or networks. For example, a first party application system 130 or a third party application system 140 may send a content distribution request to content distribution system 160, and the content distribution system 160 may forward the request to multiple different application software systems including first party application software system 130 and/or third party application system 140, as the case may be. In some embodiments, content distribution system 160 is owned or managed by a different entity than third party application system 140 and first party application software system 130. In other embodiments, portions of content distribution system 160 may be owned or managed by third party application system 140 or first party application software system 130.

Content distribution system 160 can include a data storage service, such as a web server, which stores digital content items that may be included in a content distribution. In some embodiments, content distribution system 160 processes content distribution requests from, for example, first party application software system 130 or third party application system 140, and distributes digital content items to user systems 110 in response to requests. For example, content distribution system 160 delivers digital content items to web sites and mobile apps or to particular slots of web sites or mobile app user interface display screens.

In some embodiments, first party application software system 130 or third party application software system 140 includes an event logging service (not shown). The event logging service captures user interface events such as page loads and clicks in real time, and formulates the user interface events into a data stream that can be consumed by, for example, a stream processing system. For example, when a user of first party application system 130 or third party application system 140 clicks on a user interface control such as view, comment, share, like, or loads a web page, or scrolls through a feed, etc., the event logging service fires an event to capture an identifier, an event type, a date/timestamp at which the user interface event occurred, and possibly other information about the user interface event, such as the impression portal and/or the impression channel involved in the user interface event (e.g., device type, operating system, etc.).

Conversion as used herein refers to a user interface event or combination of user interface events that counts as an interaction with a product, service, or digital content item that has been defined as valuable to the provider of the product, service, or digital content item. Examples of conversion events include initiating and/or completion of an online sales transaction with the provider, generation of a message to the provider, a visit to the provider's website, and filling out an online form of the provider. When an interaction is initiated by a first party application but the conversion occurs within a third party application system, e.g., by a visit to a third party web page, the user interface event data associated with the conversion may be owned by the third party application system and thus subject to data security rules that prevent or restrict the sharing of individualized entity information outside of the third party application system.

The event logging service generates a data stream that includes one record of real-time event data for each user interface event that has occurred. Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes.

Data storage system 180 includes data stores and/or data services that store digital content items, data received, used, manipulated, and produced by first party application software system 130 and/or third party application system 140. Alternatively or in addition, data storage system 180 includes data stores and/or data services that store data received, used, manipulated, and produced by group profile creator 132, such as lists of query terms, entity data records containing attribute values, and mappings between group profiles and query terms. In some embodiments, data storage system 180 includes multiple different types of data storage and/or a distributed data service. As used herein, data storage system may refer to a physical, geographic grouping of machines, a logical grouping of machines, or a single machine. For example, a data storage system may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, first party application software system 130, third party application software system 140, content distribution system 160, and data storage system 180 includes an interface embodied as computer programming code stored in computer memory that when executed causes a computing device to enable bidirectional communication with any other of user system 110, first party application software system 130, third party application software system 140, content distribution system 160, and data storage system 180 using a communicative coupling mechanism. Examples of communicative coupling mechanisms include network interfaces, inter-process communication (IPC) interfaces and application program interfaces (APIs).

A client portion of first party application software system 130 and/or third party application software system 140 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running first party application software system 130 and/or a server portion of first party application software system 130 can receive the input, perform at least one operation using the input, and return output using an HTTP response that the web browser receives and processes.

Each of user system 110, first party application software system 130, third party application software system 140, content distribution system 160, and data storage system 180 is implemented using at least one computing device that is communicatively coupled to electronic communications network 120. Any of user system 110, first party application software system 130, third party application software system 140, content distribution system 160, and data storage system 180 can be bidirectionally communicatively coupled by network 120. User system 110 as well as one or more different user systems (not shown) can be bidirectionally communicatively coupled to first party application software system 130.

A typical user of user system 110 can be an administrator or end user of first party application software system 130, third party application software system 140, content distribution system 160, and/or content distribution system 160. User system 110 is configured to communicate bidirectionally with any of first party application software system 130, third party application software system 140, and/or content distribution system 160 over network 120.

The features and functionality of user system 110, first party application software system 130, third party application software system 140, content distribution system 160, and data storage system 180 are implemented using computer software, hardware, or software and hardware, and can include combinations of automated functionality, data structures, and digital data, which are represented schematically in the figures. User system 110, first party application software system 130, third party application software system 140, content distribution system 160, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

The disclosed technologies can be described with reference to an example use case of digital content distribution involving a social graph-based application such as a professional social network application. The disclosed technologies are not limited to use in connection with social graph applications but can be used to provide data security for content distribution systems more generally. The disclosed technologies can be employed by many different types of network-based applications in which content distribution is provided, including but not limited to various types and forms of application software systems.

Figure 2:
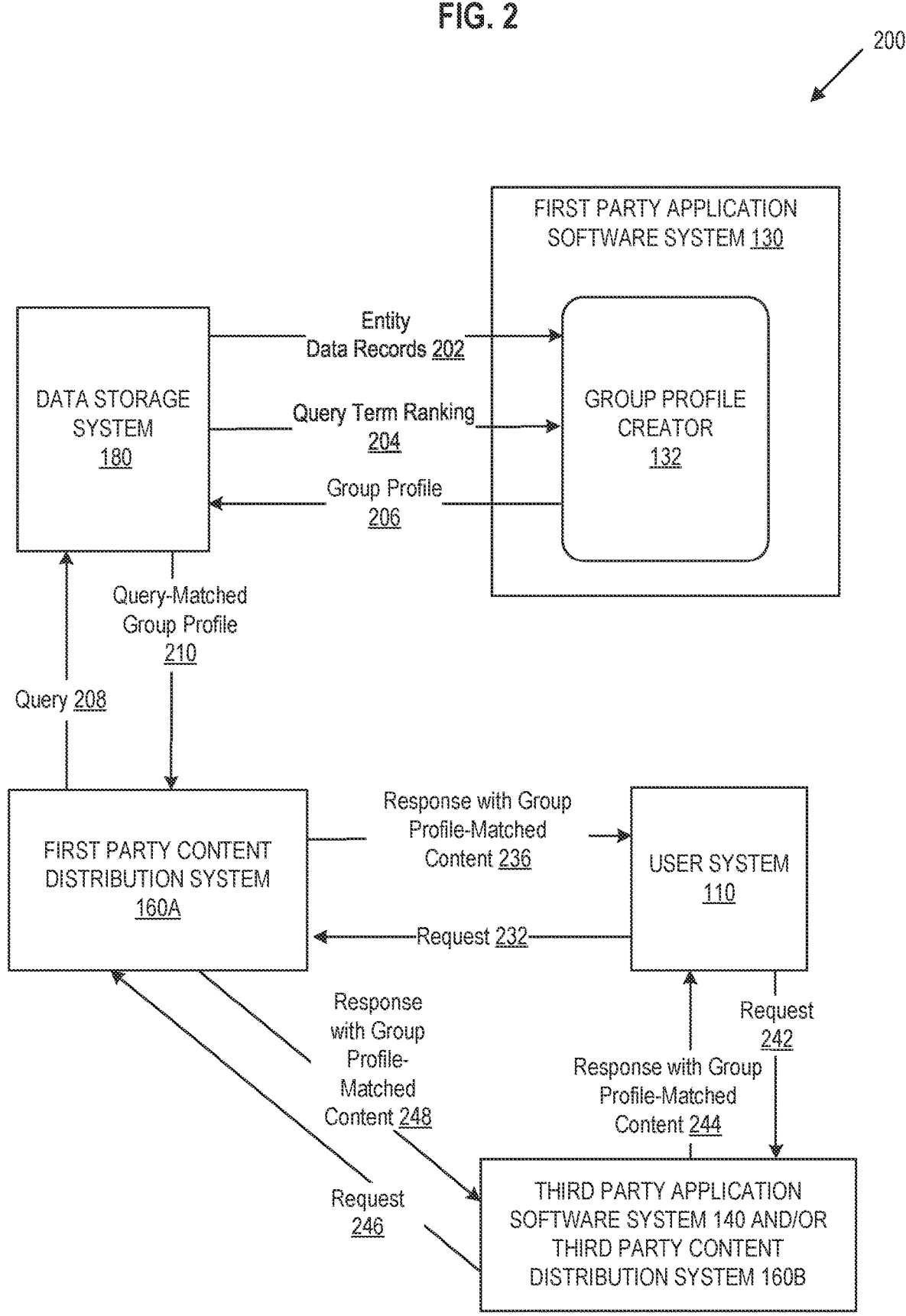
FIG. 2 is a flow diagram of an example method 200 for creating a group profile in accordance with some embodiments of the present disclosure.

FIG. 2 is a flow diagram of an example method 200 for creating a group profile and applying the group profile to one or more content distributions in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, portions of the method 200 are performed by the group profile creator 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In operation, embodiments of group profile creator 132 reside on the server side of a first party application software system 130. Group profile creator 132 receives entity data records 202 from a searchable database of data storage system 180. For example, group profile creator 132 runs a query periodically to retrieve entity data records of all entities that have been active in first party application software system 130 during the previous x days, where x is a positive integer.

Group profile creator 132 also retrieves or obtains a query term ranking 204 from data storage system 180. Query term ranking 204 is an ordered list of query terms. The query term ranking 204 ranks query terms in a descending order of value such that the query term with the highest value has rank 1, the query term with the second highest value has rank 2, and so on. Stated another way, query term ranking orders query terms in ascending order of cardinality such that a query term that has rank 1 is processed before a query term that has rank 2, the query term that has rank 2 is processed before a query term that has rank 3, and so on. In query term ranking 204, the value of a query term is determined or provided by a content distribution provider and not by the popularity or frequency of use of the query term by an end user or population of end users. In some embodiments, query term ranking 204 includes all possible query terms that could possibly be used to define a group profile; e.g., all possible attribute values of all of the entities in the data set of entity data records 202. As a performance enhancement, in some embodiments, the query term ranking 204 is pre-processed to reduce the size of the list of ranked query terms to remove query terms that have a very low probability (e.g., a probability that is less than a threshold probability value) of being included in a group profile because there are too few matching entity data records.

Group profile creator 132 methodically selects query terms from query term ranking 204, in rank order starting with the highest-ranked query term. For each query term, group profile creator 132 determines a subset of the retrieved data set of entity data records 202 that matches the query term and applies algorithmic data security techniques to the matching subset and to the remaining non-matching subset of entity data records 202. The algorithmic data security techniques include an integrated k-anonymous and differential privacy algorithm. Based on the output generated by the algorithmic data security techniques, group profile creator 132 determines whether to add the query term to the group profile 206 or to skip the query term without adding the query term to the group profile.

Group profile creator 132 iterates through the query term ranking 204 in rank order, e.g., in descending order of query term value. For example, group profile creator 132 can iterate over the query term ranking 204 until the algorithmic data security techniques have been applied to all of the query terms in the query term ranking 204 or until the output of the algorithmic data security techniques indicates that the desired level of data security has been reached or until the desired level of data security would not be met for a particular query term. For example, group profile creator 132 can stop iterating even if not all query terms in the query term ranking 204 have been analyzed, if the output of the algorithmic data security techniques indicates that the matching data set is within some tolerance range of the applicable data security requirements.

Data security requirements as used herein are reflected by the values of one or more parameters of the algorithmic data security techniques. For example, the value of k for k-anonymity and the differential privacy parameters E, 4, 6, which are described in more detail below. The values of these parameters can be obtained by group profile creator 132, for example, by querying first party application 130, third party application 140 or content distribution system 160, or by performing a lookup on a data store, or by extracting the values from a message such as a request.

Once group profile creator 132 has created group profile 206, group profile 206 is stored at data storage system 180; for example, in a searchable database. The data included in the storage of group profile 206 includes, for example, a set of one or more query terms contained in the group profile 206 and/or a mapping of the group profile 206 to the matching subset of entity data records 202. The mapping is implemented as an internal, non-shareable set of tuples, in some embodiments, where each tuple associates a unique group profile identifier with a particular entity record identifier. A group profile data record includes, for instance, a unique group profile identifier, the set of query terms that make up the group profile definition, and a unique identifier for the matching subset of entity data records 202. Alternatively, the group profile data record could include a set of unique identifiers of the entity data records that match the group profile instead of a matching subset identifier. At data storage system 180, group profile 206 is accessible over network 120 by, e.g., downstream processes, systems, devices, or services.

Group profile 206 can be used to match content distributions with entities or entity data records. FIG. 2 shows two different content distribution examples: a first content distribution example that uses a first party content distribution system 160A and a second example that uses third party application software system 140 and/or a third party content distribution system 160B.

In the first party content distribution example, when a content distribution request 232 is received at first party content distribution system 160A from a requesting system such as a user system 110, first party content distribution system 160A formulates a query 208 based on the request 232 and provides the query 208 to data storage system 180. The query 208 is applied to the searchable database of data storage system 180 that contains the group profile mapping data to produce a query-matched group profile 210. The query-matched group profile is provided to first party content distribution system 160A.

First party content distribution system 160A applies the query-matched group profile 210 to at least one content repository or corpus of digital content items (not shown) in the form of a query. First party content distribution system 160A generates a response that includes group-profile matched content 236 and provides the response and group-profile matched content 236 to user system 110. In this way, a group profile rather than an individual user profile is used to generate a content distribution for the user system 110 by matching the group profile to content and providing the group profile-matched content distribution to the requesting system as a response 236. Content distribution requests and responses are, for example, network messages such as an HTTP (HyperText Transfer Protocol) requests for data, such as a page load, and corresponding HTTP responses.

In some embodiments, the content distribution is generated by first party content distribution system 160A. For example, first party content distribution system 160A queries data storage system 180 to obtain query-matched group profile 210. Content distribution system 160A determines a set of one or more group profile-matched content items by comparing the query terms in the query-matched group profile 210 to a set of content items stored in a corpus of digital content items (e.g., a searchable data store or the Internet). Content distribution system 160A provides the group profile-matched content items 236 to user system 110 based on and responsive to the corresponding request 232.

Alternatively, third party application software system 140 and/or a third party content distribution system 160B handles a content distribution request generated by a user system 100 in cooperation with first party content distribution system 160A. In this second example, the third party application software system 140 and/or third party content distribution system 160B receives a content distribution request 242 from user system 110. Third party application software system 140 and/or third party content distribution system 160B processes the request 242 and provides a corresponding request 246 to first party content distribution system 160A. The request 246 includes at least some of the information contained in request 242 but is perhaps reformulated into a different format for communication with first party content distribution system 160A.

First party content distribution system 160A processes request 246, formulates a corresponding query 208, and provides the query 208 to data storage system 180. The query 208 is applied to the searchable database of data storage system 180 that contains the group profile mapping data to produce the query-matched group profile 210. The query-matched group profile is provided to first party content distribution system 160A.

First party content distribution system 160A applies the query-matched group profile 210 to at least one content repository or corpus of digital content items (not shown) in the form of a query. First party content distribution system 160A generates a response that includes group-profile matched content 248 and provides the response and group-profile matched content 248 to third party application software system 140 and/or third party content distribution system 160B. Third party application software system 140 and/or third party content distribution system 160B processes response 248 and provides a corresponding response with group profile matched content 244 to user system 110 in response to request 242. The response 244 includes at least some of the information contained in response 248 but perhaps reformulated for communication to user system 110.

In this way, the described approaches can be used even in implementations that involve a third party system. As shown in FIG. 2, the third party system 140/160B does not have access to the group profile or any of the internal operations or data of group profile creator 132. Nonetheless, the group profile rather than an individual user profile is used to generate the content distribution to the user system 110 via the third party system 140/160B.

First party application software system 130, third party application software system 140, or content distribution system 160A/B, as the case may be, provides instructions to user system 110 to present the group profile-matched content items in user interface 112 in accordance with and responsive to the corresponding request 232, 242.

Figure 3:
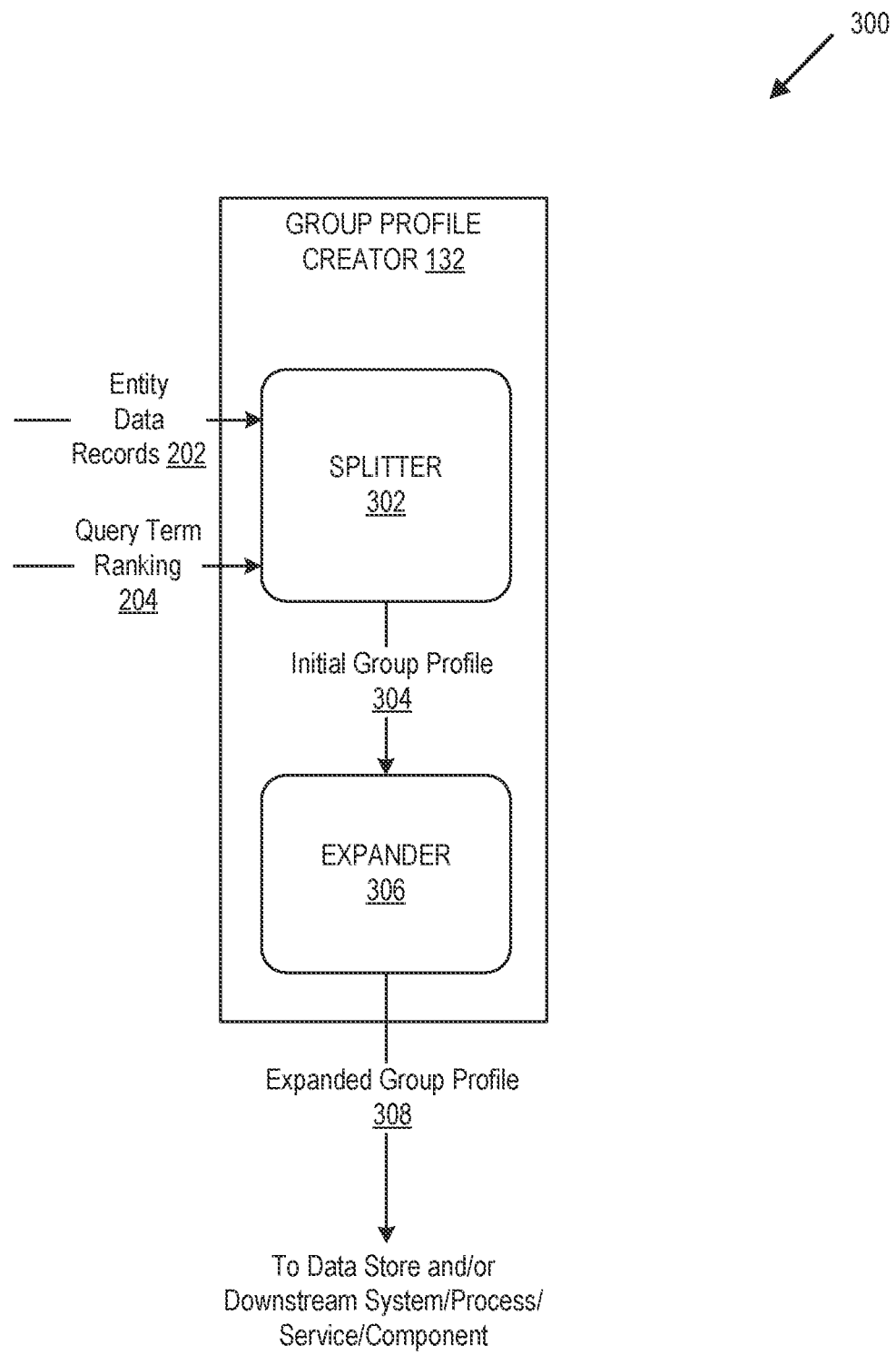
FIG. 3 is a flow diagram of an example method 300A to implement a group profile creator in accordance with some embodiments of the present disclosure.

FIG. 3 is a flow diagram of an example method 300 to implement a group profile creator in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the group profile creator 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3 shows an embodiment of group profile creator 132 that includes a splitter 302 and an expander 306. As described in more detail below, both splitter 302 and expander 306 implement algorithmic data security techniques. For example, splitter 302 integrates a first differential privacy algorithm with a k-anonymous algorithm and expander 306 integrates a second differential privacy algorithm different than the first differential privacy algorithm with a top S algorithm.

Splitter 302 produces an initial group profile 304 that contains an initial set of one or more query terms. Expander 306 adds zero or more additional query terms to initial group profile 304 to produce expanded group profile 308. As such, expanded group profile 308 can be the same as initial group profile 304 or different from initial group profile 304. Group profile creator 132 outputs or otherwise makes available expanded group profile 308 to a datastore, a downstream system, process, service, or component, such as a content distribution system.

Splitter 302 ensures that the group size of any group created using a group profile strictly adheres to the applicable k-anonymous data security requirements. Once a group profile has been created by splitter 302 that strictly adheres to the applicable k-anonymous requirements, expander 306 expands the group profile to include one or more additional query terms without changing the size of the group and thus without impacting the k-anonymity of the group. Expander 306 is optional in some embodiments. For example, if expanding the profile to add an additional query term would adversely affect a differential privacy requirement, expander 306 can be bypassed or skipped.

In more detail, splitter 302 receives as inputs the set of entity data records 202 and the query term ranking 204. Splitter 302 selects one query term at a time starting at the top of the ordered list query term ranking 204. For each query term, splitter 302 determines whether both the group size of matching entity data records and the group size of non-matching entity data records is at least a first threshold, k. The value of the threshold k is determined based on the data security requirements of a particular implementation.

As an example, if the first query term is "software developer," splitter 302 measures the number of entity data records that have software developer as an attribute value and also measures the number of entity data records that do not have software developer as an attribute value. If both measurements are greater than or equal to k, the first query term is added to the group profile of the group of entity data records that have software developer as an attribute, and the group is split. Thus, after the first iteration, the group profile contains "software developer" in the above example. If one or both of the measurements are less than k, the first query term is skipped and not added to the group profile.

Splitter 302 then proceeds to evaluate the next query term in the query term ranking 204. For example, if the next query term is "Bay Area," splitter 302 determines whether the set of matching entity data records that have both software developer and Bay Area as attribute values and the set of non-matching entity data records that do not have both software developer and Bay Area as attribute values is at least k. If both measurements are greater than or equal to k, the next query term is added to the group profile that describes the group of entity data records that have both software developer and Bay Area as attributes.

Thus, after the second iteration, the group profile contains "software developer" and "Bay Area" in the above example. If the group size measurement is less than k, the next query term is skipped and not added to the group profile. Splitter 302 continues iterating over the query terms in query term ranking 204 until all of the query terms have been analyzed. In some embodiments, once all of the query terms have been analyzed, splitter 302 adds differential privacy to the group profile using for example, a top-S algorithm.

One of the technical challenges of incorporating differential privacy is the requirement that groups must have a size of at least k for strict k-anonymity. Naively including differential privacy to the group building procedure could result in groups that have no members while forcing groups to be a certain minimum size leads to poor and inconsistent data security outcomes. To overcome these technical challenges and ensure that the group sizes remain at least k after differential privacy is applied, splitter 302 implements an approximate differential privacy algorithm; that is, a ($\varepsilon$, $\delta$)—differential privacy algorithm where $\delta$>0.

Another technical challenge to incorporating differential privacy into splitter 302 is that the groups are functions of the counts of data records that match the query terms in the group profile. As a result, determining count sensitivity is not straightforward because a single entity could contribute to the counts of every possible query term if its entity data record contains all possible query terms. To address this challenge, splitter 302 uses algorithms that have data security loss that scales with the number of query terms that can be in any group profile. That is, even if an entity data record contributes to the counts of many different query terms, the loss of data security will only scale with the number of query terms allowed in the group profile.

In more detail, splitter 302 uses an anonymous sparse vector technique to implement differential privacy. Whereas the classical sparse vector technique has no guarantee that each group will be of a sufficient size k, the disclosed anonymous sparse vector technique only considers queries that have a true count of at least some value k and then adds a noisy threshold to k. Unlike the classical sparse vector technique, the anonymous sparse vector technique presented here also ensures that the threshold is dependent on the data security requirements (e.g., $\varepsilon$, $\delta$). For example, if a data set only contains elements with counts of at least some size, then the sparse vector does not need to iterate over every possible query term's count but rather only query terms that actually have sufficiently large (e.g., at least k) counts. An embodiment of the anonymous sparse vector technique is shown below.

be further divided or the query term cannot be added to the group profile). If the sum of the function output and the query term-specific noise is greater than or equal to the sum of the threshold $T_i$ plus the threshold noise Z, return ⊤ as an output signal so that a split can occur. Thus, plausible deniability is provided because there are two possible explanations for why the mechanism might return ⊥ but the particular reason associated with a given instance of ⊥ remains unknown to the recipient of the output signal. When ⊤ is returned, the mechanism stops and returns the subsequence, e.g., {⊥, ⊥, . . . , ⊥, ⊤ } of length at most m.

In one example implementation, $\Delta=1$, $k_i=k$ for each i, where i denotes the iteration (e.g., query term of the ranked list of query terms), and $f_i(x)=\min$ {number of matching data records in x with query term $c_i$, number of members in x without query term $c_i$}. In the example implementation, the threshold $T_i$ is computed as follows: $T_i:=k_i+\Delta+\Delta/\varepsilon_1 \log(1/\delta)+2\Delta/\varepsilon_2 \log(3m/\delta)$.

The values of the differential privacy parameters are set according to the data security requirements of a particular implementation. Capital delta $\Delta$ indicates the amount by which a single entity can modify $f_i(x)$ (e.g., the count). Capital delta $\Delta$ is set to 1 in the example implementation because a member of x can change the count $f_i(x)$ by at most 1.

Small delta $\delta$ represents an approximation parameter in approximate differential privacy. The epsilon $\varepsilon_1$, $\varepsilon_2$ values can be adjusted to increase or decrease the amount of noise, and hence, the level of data security. For example, larger epsilon values can signify a lower degree of data security. As shown in the equation above, the threshold $T_i$ is a function of the k-anonymity parameter k as well as the differential privacy parameters $\varepsilon_1$, $\varepsilon_2$, and $\delta$.

Splitter 302 outputs initial group profile 304 and the corresponding matching subset of the initial data set of entity data records 202. For instance, if the initial group

---

Algorithm 1

Anonymous Sparse Vector Algorithm - Returns a query if the query has a large enough count.
Input: Stream of m real valued queries $f_1$, ..., $f_m$ that have maximum sensitivity $\Delta > 0$ as well as data set x and stream of strict thresholds $k_1$, ..., $k_m$ and expected thresholds $T_1$, ..., $T_m$.
Sample Z ~ Lap ($\Delta/\varepsilon_1$)
for i ∈ [m] do
   Sample $Z_i$ ~ Lap ($2\Delta/\varepsilon_2$)
   if $f_i(x) \geq k_i$ then
     if $f_i(x) + Z_i > T_i + Z$ then
       $o_i$ = ⊤
       break.
     else
       $o_i$ = ⊥
   else
     $o_i$ = ⊥
Return $o_1$, $o_2$, ... ∈ {⊥,⊤ }*.

---

In algorithm 1, a threshold noise Z is sampled from a Laplace distribution Lap ($\Delta/\varepsilon_1$). For each query function output $f_i(x)$ (e.g., a count of data records), return ⊥ as an output signal that the data set is not both k-anonymous and differentially private. If the function output $f_i(x) \geq k_i$, a query-term specific noise $Z_i$ is sampled from another Laplace distribution Lap ($2\Delta/\varepsilon_2$).

The sum of the noise $Z_i$ added to the function output $f_i(x)$ is compared to the sum of a threshold $T_i$ added to the threshold noise Z. If the sum of the function output and the query term-specific noise is less than the sum of the threshold $T_i$ plus the threshold noise Z, return ⊥ as an output signal to denote that a split cannot occur (i.e., the data set x cannot profile 304 contains "software developer" and "Bay Area" then the corresponding matching subset includes those entity data records that contain attribute values that match both software developer and Bay Area.

Expander 306 receives initial group profile 304 as an input. Expander 306 determines whether any additional query terms can be added to the initial group profile 304 without destroying the k-anonymity of the matching subset associated with the initial group profile 304. Expander 306 queries the matching subset to determine whether there are any query terms that are shared by at least some threshold t amount of entity data records in the matching subset.

The value of the threshold t is determined based on the data security and group profile specificity requirements of a particular implementation. In some embodiments, t is a percentage value. For example, if t is set to 80% and the query term "Java" is contained in 80% of the entity data records in the matching subset, then Java is added to the group profile. Expander 306 does not change the group size of the matching data subset but does improve the recall of the group profile by adding additional query terms after the group size has been set by splitter 302.

Differential privacy is also incorporated into expander 306, although a different differential privacy algorithm is used than the one used by splitter 302. Expander 306 implements a differentially private top-S algorithm that introduces the differential privacy parameters ε, δ>0 and imposes a limit on the number of additional query terms S can be included in the group profile. Whereas other approaches would try to return as many as S elements whose counts are above some noisy threshold based on the absolute counts, expander 306 adds noise to the group size to provide a relative threshold. For example, expander 306 adds Gaussian noise to the true size n of a group to produce a noisy threshold ñ. Expander 306 then only checks to see if query terms with a true count of at least t*ñ will have a count larger than a noisy threshold, where * signifies multiplication.

Figure 4:
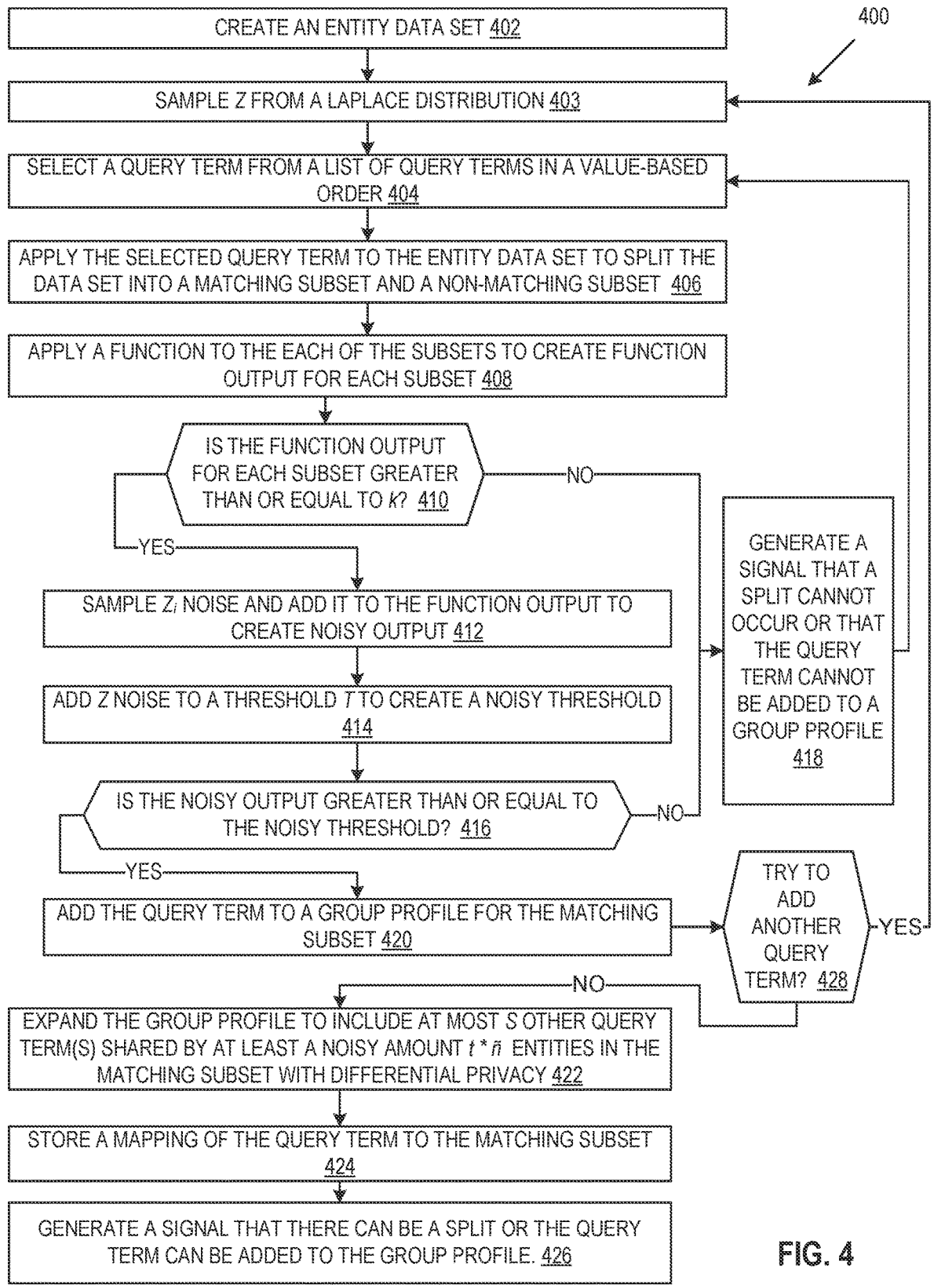
FIG. 4 is a flow diagram of an example method 400 for creating a group profile in accordance with some embodiments of the present disclosure.

FIG. 4 is a flow diagram of an example method 400 for creating a group profile in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the group profile creator 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing device creates an entity data set. An entity data set includes entity data records that match a search criteria. For example, the entity data set can include entity data records for entities that recently have been active in an application software system.

At operation 403, the processing device determines an amount of noise, Z. In some embodiments, the processing device computes Z by sampling a Laplace distribution or a Gaussian distribution, as described in more detail below.

At operation 404, the processing device selects a query term from a list of query terms in a value-based order. The list of query terms includes non-identifying terms that can be used to describe members of a group without identifying any individual member of the group. For example, a unique entity identifier would not be included in the list of query terms, but a job title or geographic location could be included in the list of query terms. The list of query terms ranks the terms in a descending order of value, where the value of a query term is determined by, for example, a content distribution system and not by the popularity of the query term among users of the first party application system. Stated another way, the query terms are listed in rank order with the highest value query term having rank 1, the next highest value query term having rank 2, and so on.

At operation 406, the processing device applies the selected query term to the entity data set to split the data set into a matching subset and a non-matching subset. The matching subset includes entity data records that contain at least one attribute value that matches the selected query term. The non-matching subset includes entity data records that do not contain any attribute values that match the selected query term. Thus, the matching subset and the non-matching subset are mutually exclusive sets of entity data records.

At operation 408, the processing device applies a function to each of the subsets to create function output for each subset. In some embodiments, the function is a count function, such that the function output includes a count of the number of entity data records in the subset to which the function was applied. In other embodiments, the function is, for example, any type of aggregation function such as a sum, an average, etc. In some embodiments, operation 408 includes generating, by the function, as the function output, a first true count of entity data records in the matching subset and a second true count of entity data records in the non-matching subset. True count as used herein refers to a count of data records without the addition of any noise.

At operation 410, the processing device determines whether the function output determined at operation 408 for each subset is greater than or equal to a first threshold k, where k is a real value. In some embodiments, operation 410 includes determining the first threshold k based on a data security requirement for the group profile. In some embodiments, operation 410 includes determining whether both a first true count and a second true count computed at operation 408 are greater than or equal to the first threshold k.

If the result of operation 410 is no, a split of the matching subset cannot be made and the processing device proceeds to operation 418, described below. If the result of operation 410 is yes, a split of the matching subset potentially can be made (might be possible) and the processing device proceeds to operation 412. At operation 412, the processing device determines and adds first noise $Z_i$ to the function output produced at operation 408 to create noisy output. In some embodiments, operation 412 includes computing the first noise $Z_i$ by sampling a Laplace distribution that has been created using at least one differential privacy parameter. In other embodiments, operation 412 computes the first noise $Z_i$ by sampling a Gaussian distribution. Thus, whereas Z is computed at operation 403, $Z_i$ is determined at operation 412, in the illustrated embodiment.

At operation 414, the processing device adds second noise Z (computed at operation 403) to a second threshold T to create a noisy threshold. In some embodiments, operation 403 includes computing the second noise Z by sampling a Laplace distribution that has been created using at least one differential privacy parameter. The Laplace distribution used to produce Z is different than the Laplace distribution used to produce $Z_i$ in some embodiments. For example, Z and $Z_i$ are produced using different values of data security parameters, in some embodiments. In other embodiments, operation 403 computes the second noise Z by sampling a Gaussian distribution. The values of Z and $Z_i$ are numeric values; for example, positive real numbers or positive integers.

In the embodiment of FIG. 4, the value of Z is sampled once for each split that is made. Once a split can be made, the query is added to the group profile of the group that contains the query. In this way, Z is reused for subsequent iterations in which a split cannot be made, while $Z_i$ is freshly sampled on each iteration of checking whether a split can be made or not for each query term. Thus, whereas the value of Z remains constant across iterations when no split is made, the value of $Z_i$ changes for each iteration regardless of whether a split is made or not. For example, a new value of Z is generated after each query term is added to a profile.

In some embodiments, operation 414 includes setting the second noise Z to a value that is greater than the first noise $Z_i$. Operation 414 includes, in some embodiments, computing the second threshold T as a function of at least the first threshold k, at least one first differential privacy parameter E, and a second differential privacy parameter Δ. Operation 414 includes setting the second threshold T to a value that is greater than the first threshold k, in some embodiments. The values of T and each of the differential privacy parameters are numeric values; for example, positive real numbers or positive integers.

At operation 416, the processing device determines whether the noisy output created at operation 412 is greater than or equal to the noisy threshold created at operation 414.

If the result of operation 416 is no, a split of the matching subset cannot be made and the processing device proceeds to operation 418. At operation 418, the processing device generates a signal that there cannot be a split or that the query term cannot be added to the group profile. Following operation 418, the processing device returns to operation 404 to select a next query term and repeat the method 400 for the next query term.

If the result of operation 416 is yes, a split of the matching subset can be made and the processing device proceeds to operation 420. At operation 420, the processing device adds the query term to a group profile for the matching subset produced at operation 406, and then proceeds to operation 428.

At operation 428, the processing device determines whether to try to add another query term to the group profile. For example, the processing device determines whether there are any remaining query terms in the ranked list of query terms that have not been processed. If the result of operation 428 is yes, the processing device returns to operation 403 to determine a new value of Z and try to add more query terms to the group profile and make more splits.

If the result of operation 428 is no, the processing device proceeds to operation 422. At operation 422, the processing device expands the group profile of operation 420 to include at most S other query terms that are shared by at least a noisy amount t*ñ entities in the matching subset (where * signifies multiplication). The limit S is the maximum number of additional query terms that can be added to a group profile during the expansion phase. In some embodiments, operation 422 includes determining the value of t based on a frequency of occurrence of the second query term in the matching subset. For example, t is a percentage value or amount, such as 80%, such that if the second query term appears in 80% of entities in the matching subset, the second query term is added to the group profile. In some embodiments, operation 422 includes computing the third noise ñ by sampling a Gaussian distribution or by sampling a Laplace distribution. The values of S, t, and ñ are numeric values; for example, positive real numbers or positive integers, which are determined and set or adjusted based on the data security requirements of a particular design or implementation.

At operation 424, the processing device stores a mapping of the query term selected at operation 404 to the matching subset. For example, the processing device stores an indication that a query containing the selected query term can produce the matching subset of entity data records in a data storage system accessible by a first party application software system.

At operation 426, the processing device generates a signal that there can be a split or that the query term can be added to the group profile for the group profile produced at operations 420, 422.

Operation 420 can repeatedly return to operation 404 until no more splitting can be done. Once all of the splitting is done, the processing device proceeds to operation 422. In some embodiments, the same value of second noise Z that is used in operation 404 also continues to be used in subsequent iterations each time there is a no decision at operation 416. If there is a yes decision at operation 416, a new value of second noise Z is sampled and the processing device tries to make a new split with the query terms.

As part of or following operation 426, the processing device, using the group profile, transforms the set of data records into an anonymized and differentially-private group of data records, in some embodiments. As part of or following operation 426, in some embodiments, the processing device performs additional operations including receiving a request from a third party application, matching the group profile to the request, selecting a content distribution based on the matched group profile, and providing the content distribution to a user system that is associated with the group profile. In some embodiments, as part of or following operation 426, the processing device performs additional operations including receiving a request from a user system, matching the group profile to a request, selecting a content distribution based on the matched group profile; and providing the content distribution to the user system.

Figure 5:
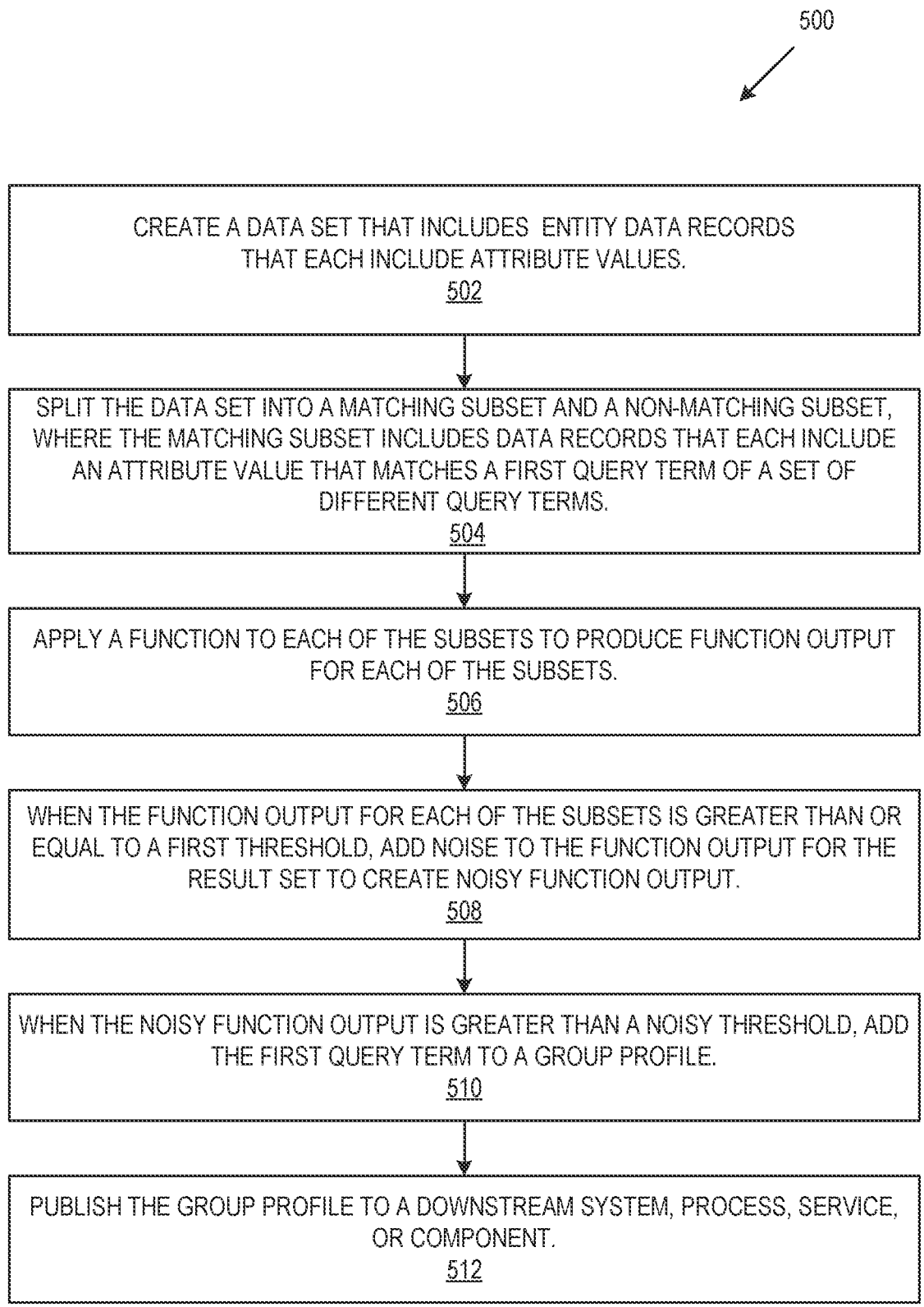
FIG. 5 is a flow diagram of an example method 500 for creating a group profile in accordance with some embodiments of the present disclosure.

FIG. 5 is a flow diagram of an example method 500 for creating a group profile in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the group profile creator 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device creates a data set that includes entity data records that each include attribute values. In some embodiments, operation 502 is performed by group profile creator 132. In other embodiments, operation 502 is performed by a different system or service and group profile creator 132 receives or obtains the data set from the different system or service.

At operation 504, the processing device splits the data set of operation 502 into a matching subset and a non-matching subset, where the matching subset includes data records that each include an attribute value that matches a first query term of a set of different query terms. Operation 504 is performed by splitter 302, described above, in some embodiments.

At operation 506, the processing device applies a function to each of the subsets produced at operation 504 to produce function output for each of the subsets (i.e., the matching subset and the non-matching subset). Operation 506 is performed by splitter 302, described above, in some embodiments.

At operation 508, the processing device, when the function output produced at operation 506 for each of the subsets is greater than or equal to a first threshold, adds noise to the function output for the result set to create noisy function output. Operation 508 is performed by splitter 302, described above, in some embodiments.

At operation 510, the processing device, when the noisy function output produced at operation 508 is greater than a noisy threshold, adds the first query term to a group profile. Operation 510 is performed by splitter 302, described above, in some embodiments.

At operation 512, the processing device publishes the group profile of operation 510 to a downstream system, process, service, or component, such as a content distribution system or a data storage system.

In some embodiments, at or after operation 512, the processing device performs operations including matching the anonymized, differentially-private subset of the data set to a query that comprises the first query term.

In some embodiments, when the function output for the matching subset is less than the first threshold or the function output for the matching subset of operation 504 is greater than or equal to the first threshold and the function output for the matching subset plus the first noise is less than the second threshold plus the second noise, the processing device performs operations including skipping the first query term and selecting a next query term from the list of ordered query terms.

In some embodiments the processing device performs operations including, when the function output for each of the subsets is greater than or equal to the first threshold and the function output for the matching subset plus first noise is greater than or equal to the second threshold plus the second noise and at least a third threshold plus third noise of entity data records in the matching subset contain a second query term different from the first query term, expanding the group profile to include the second query term.

In some embodiments, one or more of the operations of method 400 and/or method 500 are incorporated into or performed by a content distribution system. That is, any of the operations described above could be performed as part of a content distribution process or by a content distribution system. For example, a processing device performs digital content distribution including creating a data set that includes a plurality of entity data records each comprising a plurality of attribute values, by applying a first data security technique to the data set, determining a first query term and a matching subset of the data records, applying a second data security technique different than the first data security technique to the matching subset, when the output of the second data security technique satisfies a first noisy threshold, adding the first query term to a set of query terms, applying a third data security technique different than the first and second data security techniques to the matching subset, when the output of the third data security technique satisfies a second noisy threshold, expanding the set of query terms to include a second query term, and using the set of query terms to perform the digital content distribution.

FIG. 6 illustrates an example machine of a computer system 600 within which a set of instructions, for causing the machine to perform any one or more of the methodologies discussed herein, can be executed. In some embodiments, the computer system 600 can correspond to a component of a networked computer system (e.g., the computer system 100 of FIG. 1) that includes, is coupled to, or utilizes a machine to execute an operating system to perform operations corresponding to the group profile creator 132 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions of the group profile creator component when those portions of the group profile creator component are being executed by processing device 602. Thus, similar to the description above, the group profile creator component is shown in dashed lines as part of instructions 612 to illustrate that, at times, portions of notification handling system 150 are executed by processing device 602. For example, when at least some portion of the group profile creator component is embodied in instructions to cause processing device 602 to perform the method(s) described above, some of those instructions can be read into processing device 602 (e.g., into an internal cache or other memory) from main memory 604 and/or data storage system 640. However, it is not required that all of the group profile creator component be included in instructions 612 at the same time and portions of the group profile creator component are stored in one or more other components of computer system 600 at other times, e.g., when one or more portions of the group profile creator component are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 626 include instructions to implement functionality corresponding to group profile creator component (e.g., the group profile creator 132 of FIG. 1).

Dashed lines are used in FIG. 6 to indicate that it is not required that the group profile creator component be embodied entirely in instructions 612, 614, and 644 at the same time. In one example, portions of the group profile creator component are embodied in instructions 644, which are read into main memory 604 as instructions 614, and portions of instructions 614 are read into processing device 602 as instructions 612 for execution. In another example, some portions of the group profile creator component are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods 300A, 300B, 300C, 100, 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method for creating a group profile with data security, the method including: creating a data set that includes a plurality of entity data records each including a plurality of attribute values; ordering a list of query terms of size m in descending order of value; the value is based on conversions associated with a query term; selecting a first query term from the ordered list of query terms; splitting the data set into a matching subset and a non-matching subset by applying the first query term to the data set; the matching subset includes data records that each include an attribute value that matches the first query term; the non-matching subset includes data records that do not include an attribute value that matches the first query term; determining function output for each of the matching subset and the non-matching subset by applying a function to both the matching subset and the non-matching subset; and when the function output for the matching subset and the function output for the non-matching subset are both greater than or equal to a first threshold k and the function output for the matching subset plus first noise $Z_i$ is greater than or equal to a second threshold T plus second noise Z, (i) adding the first query term to the group profile, (ii) storing a mapping of the first query term to the matching subset, (iii) generating a signal that the data set can be split into a first subgroup that has a first group profile that includes the query term and a second subgroup that has a second group profile that does not include the query term, and (iv) when at least an amount t*noisy size Ft of entity data records in the matching subset contain a second query term different from the first query term, expanding the group profile to include the second query term.

An example 2 includes the subject matter of example 1, further including (d) when the function output for the matching subset is less than the first threshold k or the function output for the matching subset is greater than or equal to the first threshold k and the function output for the matching subset plus the first noise $Z_i$ is less than the second threshold T plus the second noise Z, (i) generating a signal that the matched subset cannot be split for the first query term, and (ii) skipping the first query term.

An example 3 includes the subject matter of example 2, further including: selecting a next query term from the ordered list of query terms; and repeating one or more of the steps of example 2 and/or example 1 for the next query term until the number of repetitions is equal to the size m or the function output for the matching subset is less than the first threshold k. An example 4 includes the subject matter of any of examples 1-3, further including: receiving a request from a third party application; matching the group profile to the request; selecting a content distribution based on the matched group profile; and providing the content distribution to a user system that is associated with the group profile. An example 5 includes the subject matter of any of examples 1-4, further including: generating, by the function, as the function output, a first true count of entity data records in the matching subset and a second true count of entity data records in the non-matching subset; and determining whether both the first true count and the second true count are greater than or equal to the first threshold k. An example 6 includes the subject matter of any of examples 1-5, further including determining a data security requirement for the group profile and setting the first threshold k based on the data security requirement. An example 7 includes the subject matter of any of examples 1-6, further including computing the second threshold T as a function of the first threshold k, at least one first differential privacy parameter E, a second differential privacy parameter $\Delta$, a third differential privacy parameter $\delta$, and the size m. An example 8 includes the subject matter of any of examples 1-7, further including setting the second threshold T to a value that is greater than the first threshold k. An example 9 includes the subject matter of any of examples 1-8, further including computing the first noise $Z_i$ by sampling a first Laplace distribution created using at least one first differential privacy parameter and computing the second noise Z by sampling a second Laplace distribution created using at least one second differential privacy parameter. An example 10 includes the subject matter of any of examples 1-9, where a scale or standard deviation of the second noise Z is greater than a scale or standard deviation of the first noise $Z_i$. An example 11 includes the subject matter of any of examples 1-10, further including changing at least one of the first threshold k, the second threshold T, and the first noise $Z_i$ for the next query term in the ordered list of query terms. An example 12 includes the subject matter of any of examples 1-11, further including keeping the value of the second noise Z the same for each next query term in the ordered list of query terms until the signal indicates that a split can occur. An example 13 includes the subject matter of any of examples 1-12, further including determining the amount t based on a frequency of occurrence of the second query term in the matching subset. An example 14 includes the subject matter of any of examples 1-13, further including computing the third noise n by sampling a Gaussian distribution or by sampling a Laplace distribution.

In an example 15, a method includes: creating a data set that includes a plurality of entity data records each including a plurality of attribute values; splitting the data set into a matching subset and a non-matching subset; the matching subset includes data records that each include an attribute value that matches a first query term of a plurality of different query terms; the non-matching subset includes data records that do not include any attribute values that match the first query term; applying a function to each of the subsets to produce function output for each of the subsets;

when the function output for each of the subsets is greater than or equal to a first threshold and the function output for the matching subset plus first noise is greater than or equal to a second threshold plus second noise, generating a signal that the data set can be split into a first subgroup that has a first group profile that includes the first query term and a second subgroup that has a second group profile that does not include the query term; and when the function output for the matching subset is less than or equal to the first threshold or the function output for the matching subset is greater than or equal to the first threshold and the function output for the matching subset plus the first noise is less than the second threshold plus the second noise, generating a signal that the data set cannot be split into the first subgroup and the second subgroup.

An example 16 includes the subject matter of example 15, further including matching the first subgroup of the data set to a query that includes the first query term. An example 17 includes the subject matter of example 15 or example 16, further including, when the function output for each of the subsets is greater than or equal to a first threshold and the function output for the matching subset plus first noise is greater than or equal to a second threshold plus second noise, adding the first query term to a group profile. An example 18 includes the subject matter of any of examples 15-17, further including, when the function output for the matching subset is less than the first threshold or the function output for the matching subset is greater than or equal to the first threshold and the function output for the matching subset plus the first noise is less than the second threshold plus the second noise, (i) skipping the first query term and (ii) selecting a next query term from the plurality of different query terms. An example 19 includes the subject matter of any of examples 15-18, further including, when the function output for each of the subsets is greater than or equal to the first threshold and the function output for the matching subset plus first noise is greater than or equal to the second threshold plus the second noise and at least a third threshold plus third noise of entity data records in the matching subset contain a second query term different from the first query term, creating a group profile that includes the first query term and the second query term.

In an example 20, a method for digital content distribution includes: creating a data set that includes a plurality of entity data records each including a plurality of attribute values; by applying a first data security technique to the data set, determining a first query term and a matching subset of the plurality of entity data records; applying a second data security technique different than the first data security technique to the matching subset; when output of the second data security technique satisfies a first noisy threshold, adding the first query term to a set of query terms; applying a third data security technique different than the first and second data security techniques to the matching subset; when output of the third data security technique satisfies a second noisy threshold, expanding the set of query terms to include a second query term; and using the set of query terms to perform the digital content distribution.

An example 21 includes the subject matter of example 20, further including one or more portions of the subject matter of any of claims 1-19 in any combination.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for creating a group profile with data security, the method comprising:
    creating a data set that includes a plurality of entity data records each comprising a plurality of attribute values;
    ordering a list of query terms of size m in descending order of value;
    the value is based on conversions associated with a query term;
    selecting a first query term from the ordered list of query terms;
    (a) splitting the data set into a matching subset and a non-matching subset by applying the first query term to the data set;
    the matching subset includes data records that each include an attribute value that matches the first query term;
    the non-matching subset includes data records that do not include an attribute value that matches the first query term;
    (b) determining function output for each of the matching subset and the non-matching subset by applying a function to both the matching subset and the non-matching subset; and
    (c) when the function output for the matching subset and the function output for the non-matching subset are both greater than or equal to a first threshold k and the function output for the matching subset plus first noise $Z_i$ is greater than or equal to a second threshold T plus second noise Z, (i) adding the first query term to the group profile, (ii) storing a mapping of the first query term to the matching subset, (iii) generating a signal that the data set can be split into a first subgroup that has a first group profile that includes the query term and a second subgroup that has a second group profile that does not include the query term, and (iv) when at least an amount t * noisy size ñ of entity data records in the matching subset contain a second query term different from the first query term, expanding the group profile to include the second query term.

2. The method of claim 1, further comprising (d) when the function output for the matching subset is less than the first threshold k or the function output for the matching subset is greater than or equal to the first threshold k and the function output for the matching subset plus the first noise $Z_i$ is less than the second threshold T plus the second noise Z,
    (i) generating a signal that the matched subset cannot be split for the first query term, and
    (ii) skipping the first query term.

3. The method of claim 2, further comprising:
    (e) selecting a next query term from the ordered list of query terms; and
    repeating (a), (b), (c), (d), and (e) for the next query term until a number of repetitions is equal to the size m or the function output for the matching subset is less than the first threshold k.

4. The method of claim 1, further comprising:
    receiving a request from a third party application;
    matching the group profile to the request;
    selecting a content distribution based on the matched group profile; and
    providing the content distribution to a user system that is associated with the group profile.

5. The method of claim 1, further comprising:
generating, by the function, as the function output, a first true count of entity data records in the matching subset and a second true count of entity data records in the non-matching subset; and
determining whether both the first true count and the second true count are greater than or equal to the first threshold k.

6. The method of claim 1, further comprising determining a data security requirement for the group profile and setting the first threshold k based on the data security requirement.

7. The method of claim 1, further comprising computing the second threshold T as a function of the first threshold k, at least one first differential privacy parameter $\varepsilon$, a second differential privacy parameter $\Delta$, a third differential privacy parameter $\delta$, and the size m.

8. The method of claim 1, further comprising setting the second threshold T to a value that is greater than the first threshold k.

9. The method of claim 1, further comprising computing the first noise $Z_i$ by sampling a first Laplace distribution created using at least one first differential privacy parameter and computing the second noise Z by sampling a second Laplace distribution created using at least one second differential privacy parameter.

10. The method of claim 1, wherein a scale or standard deviation of the second noise Z is greater than a scale or standard deviation of the first noise $Z_i$.

11. The method of claim 1, further comprising changing at least one of the first threshold k, the second threshold T, and the first noise $Z_i$ for a next query term in the ordered list of query terms.

12. The method of claim 1, further comprising keeping the value of the second noise Z the same for each next query term in the ordered list of query terms until the signal indicates that a split can occur.

13. The method of claim 1, further comprising determining the amount t based on a frequency of occurrence of the second query term in the matching subset.

14. The method of claim 1, further comprising computing third noise ñ by sampling a Gaussian distribution or by sampling a Laplace distribution.

15. A method comprising:
creating a data set that includes a plurality of entity data records each comprising a plurality of attribute values;
splitting the data set into a matching subset and a non-matching subset;
the matching subset includes data records that each include an attribute value that matches a first query term of a plurality of different query terms;
the non-matching subset includes data records that do not include any attribute values that match the first query term;
applying a function to each of the subsets to produce function output for each of the subsets;
when the function output for each of the subsets is greater than or equal to a first threshold and the function output for the matching subset plus first noise is greater than or equal to a second threshold plus second noise, generating a signal that the data set can be split into a first subgroup that has a first group profile that includes the first query term and a second subgroup that has a second group profile that does not include the query term; and
when the function output for the matching subset is less than or equal to the first threshold or the function output for the matching subset is greater than or equal to the first threshold and the function output for the matching subset plus the first noise is less than the second threshold plus the second noise, generating a signal that the data set cannot be split into the first subgroup and the second subgroup.

16. The method of claim 15, further comprising matching the first subgroup of the data set to a query that comprises the first query term.

17. The method of claim 15, further comprising, when the function output for each of the subsets is greater than or equal to a first threshold and the function output for the matching subset plus first noise is greater than or equal to a second threshold plus second noise, adding the first query term to a group profile.

18. The method of claim 15, further comprising, when the function output for the matching subset is less than the first threshold or the function output for the matching subset is greater than or equal to the first threshold and the function output for the matching subset plus the first noise is less than the second threshold plus the second noise, (i) skipping the first query term and (ii) selecting a next query term from the plurality of different query terms.

19. The method of claim 15, further comprising, when the function output for each of the subsets is greater than or equal to the first threshold and the function output for the matching subset plus first noise is greater than or equal to the second threshold plus the second noise and at least a third threshold plus third noise of entity data records in the matching subset contain a second query term different from the first query term, creating a group profile that includes the first query term and the second query term.

20. The method of claim 15, further comprising:
using the first query term to perform a digital content distribution.

* * * * *